United States Patent [19]
Takaki et al.

[11] Patent Number: 5,745,246
[45] Date of Patent: Apr. 28, 1998

[54] APPARATUS FOR READING IMAGES FROM DOCUMENTS AND PRINTING INFORMATION ON SHEETS AND HAVING DOCUMENT AND SHEET INSERTING AND DISCHARGING SECTIONS AT A FRONT SURFACE THEREOF

[75] Inventors: Kosuke Takaki; Takao Araki, both of Dazaifu; Junichi Mutoh, Fukuoka-ken; Katsuzi Ichimaru, Saga-ken; Hiroshi Matsumoto, Kasuga; Tetsurou Fukuzoe, Fukuoka, all of Japan

[73] Assignee: Matsushita Electric Industrial Co., Ltd.,, Osaka, Japan

[21] Appl. No.: 275,535

[22] Filed: Jul. 15, 1994

[30] Foreign Application Priority Data

Aug. 2, 1993 [JP] Japan .................................. 5-191079

[51] Int. Cl.$^6$ .............................. H04N 1/04; G03G 21/00
[52] U.S. Cl. .......................... 358/296; 358/498; 399/361; 399/363
[58] Field of Search ..................................... 358/296, 300, 358/494, 496, 498; 355/308, 309; 347/3, 108, 138, 152, 218, 222, 245, 263; 400/578, 599, 605, 607, 608.4; 271/8.1; 399/361, 363

[56] References Cited

U.S. PATENT DOCUMENTS

| | | | |
|---|---|---|---|
| 4,933,771 | 6/1990 | Matsuura et al. | 358/296 |
| 4,969,048 | 11/1990 | Hashino | 358/296 |
| 5,023,728 | 6/1991 | Nimura et al. | 358/296 X |
| 5,025,326 | 6/1991 | Shimmyo | 358/498 |
| 5,448,374 | 9/1995 | Yokoyama et al. | 358/296 X |

*Primary Examiner*—Eric Frahm
*Attorney, Agent, or Firm*—Watson Cole Stevens Davis, P.L.L.C.

[57] ABSTRACT

An image reading and printing apparatus having a housing, a printing part located in the upper part of the housing, an image reading part located in the lower part of the housing, a sheet feeding part located in the lower part of the housing below the image reading part and receiving thereinto a sheet inserted from the lower part of the front face of the housing, a C-like shape sheet conveying path through which the sheet is led from the sheet feed part to the printing part, and is discharged outside of the housing from the upper part of the front surface thereof, and a C-like shape document conveying path through which a document inserted from the lower part of the front face of the housing is led to the image reading part, and is then discharged outside of the housing from the front face of the housing, the C-like document conveying path being surrounded by the C-like sheet conveying path, thereby making it possible to miniaturize the image reading and printing apparatus and to absorb a shift between the timing of the reading operation and the timing of the printing operation caused by the printing speed of the printing part which is relatively lower than the reading speed of the image reading part.

16 Claims, 3 Drawing Sheets ated with each other within a compact unit, and with which a user can merely touch the front face of the housing of the apparatus during normal operation.
APPARATUS FOR READING IMAGES FROM DOCUMENTS AND PRINTING INFORMATION ON SHEETS AND HAVING DOCUMENT AND SHEET INSERTING AND DISCHARGING SECTIONS AT A FRONT SURFACE THEREOF

BACKGROUND OF THE INVENTION

The present invention relates to an image reading apparatus incorporating a printing part which carries out printing and a reading part for reading data from a document.

RELATED ART

Recently, printing devices such as LED printers or laser printers, which carry out printing on a sheet such as an ordinary sheet and reading devices such as scanners, which read data from a document have been prosperously used. In particular, the reading devices have been able to perform a reading process at a relatively high speed due to the recent technical advance, and accordingly, the document feed speed thereof has become higher and higher. Meanwhile, should the document feed speed of a printing part in the above-mentioned printing device be increased up to a value substantially equal to the document reading speed of the image reading device, a photosensitive drum should be rotated at a high speed while makes contact with a cleaner within the printing device, causing abrasion of the photosensitive drum. Accordingly, the document feed speed of the printing device should be set to be relatively lower than the document reading speed of the image reading part.

It has been usual that the reading device and the image reading device are provided, independent from each other, causing a wide installation space to be required. Accordingly, an apparatus in which a printing part as the printing device and a reading part as the reading device are vertically and integrally incorporated in a housing, and in which documents and printing sheets are supplied and discharged in front of the housing so that a user normally touch the front face alone of the apparatus in order to perform all manipulations, has been proposed.

Referring to FIG. 4 which is a schematic vertically sectional view showing a conventional image reading and printing apparatus including a housing C having a front surface CA and a rear surface CB, a printing part D for carrying out printing on a sheet which is an ordinary sheet, at a printing position, and a reading part E for reading data from a document at a reading position E1 are vertically arranged in the inside space of the housing C in which a conveying path F for conveying a document and a sheet, a supply part C1 and a discharge part C2 are also incorporated.

However, should a document or a sheet be fed through such a common conveying path F, a document should be sent an inevitably slow speed required for the printing part D in order to avoid causing the above-mentioned abrasion. Accordingly, a problem such that the high speed operation of the reading part E cannot be effectively used, has been raised.

The present invention has been devised in order to eliminate the above-mentioned problem, and accordingly, one object of the present invention is to provide an image reading and printing apparatus which can effectively use the high speed operation of the reading part while the printing part and the reading part are integrally incorporated with each other within a compact unit, and with which a user can merely touch the front face of the housing of the apparatus during normal operation.

To the end, according to the present invention, the printing part includes a C-like sheet conveying path while the reading part includes a C-like document conveying path which is shorter than the sheet conveying path and laid inside of the same.

With this arrangement, a document can pass through the document conveying path which is independent from the sheet conveying path and which is shorter than the same, at a high speed in a short time so that the reading path can read data from the document at a high speed. Further, a sheet passes through the sheet conveying path at a moderate speed with which the above-mentioned abrasion can be prevented.

DESCRIPTION OF THE PREFERRED EMBODIMENTS

Explanation will be hereinbelow made of a preferred embodiment of the present invention.

Figure 1:
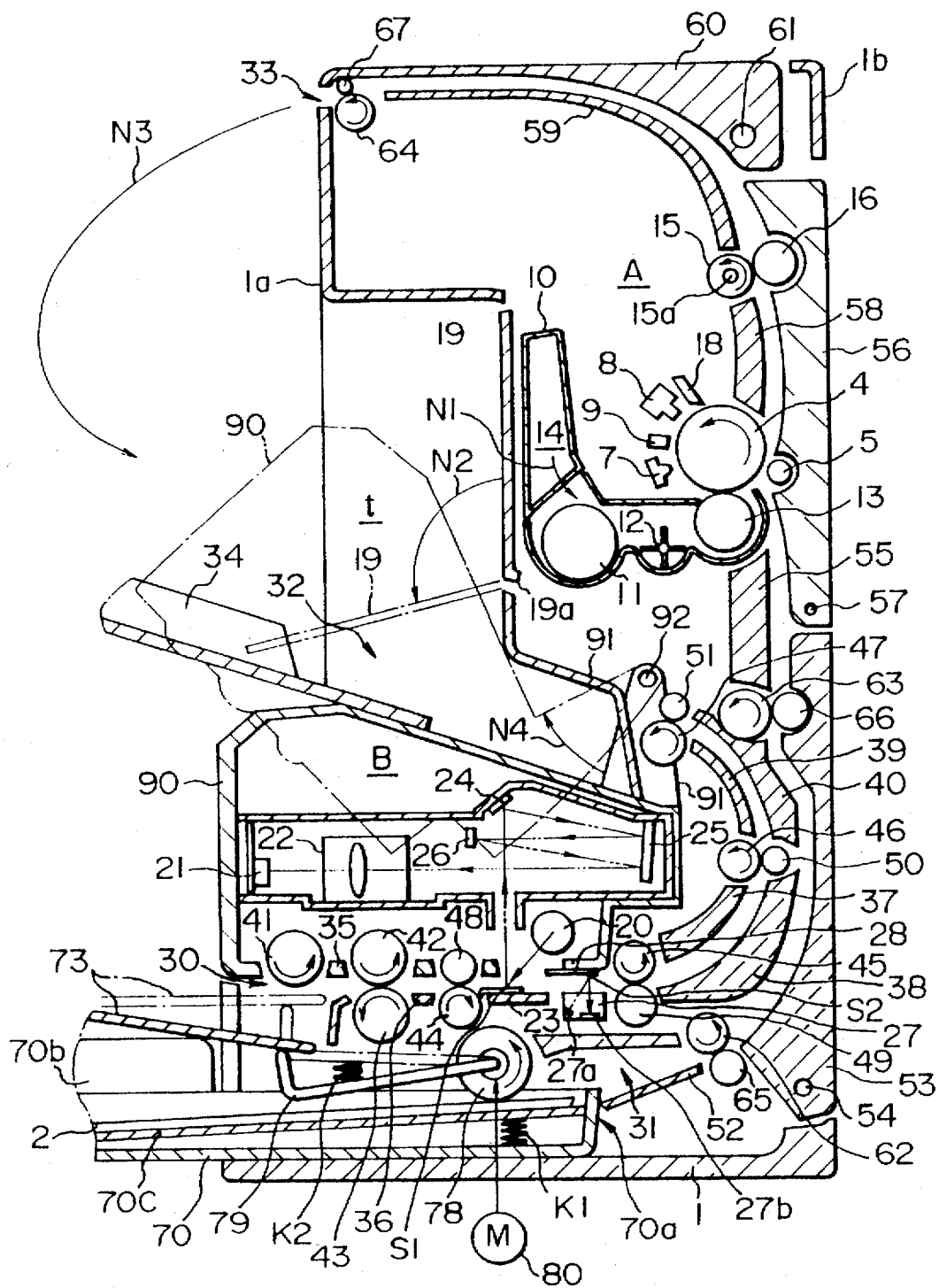
FIG. 1 is a vertically sectional view illustrating an image reading and printing apparatus in an embodiment of the present invention.

Referring to FIG. 1 which is a vertically sectional view of an image reading and printing apparatus in one embodiment of the present invention, a housing 1 is formed in a vertically long shape (tall boy shape) so as to require only a small installation space, having a front face 1a and a rear face 1b. A printing part A for carrying out printing on a sheet 2 is laid in the inside space of the housing 1 in the upper part thereof on the rear face 1b side, and a reading part B for reading data from a document 3 (refer to FIG. 3) is laid in the housing 1 below the printing part A on the front face 1a side.

The printing part A as shown, comprises a photosensitive drum 4, an image transfer roller 5 making contact with the photosensitive drum 4, a reading LED array 7, an erasing LED array 8, and a charger 9. Further, it comprises a toner storage 10, a toner discharge roller 11, an agitating roller 12, a developing roller 13, a fixing roller 15 including a heater 15a, and a press roller 16 pressed against the fixing roller 15. With this arrangement, toner 14 is shifted onto the toner discharge roller 11 as shown by the arrow N1, and then sticks onto the peripheral surface of the developing roller 13. Meanwhile, the photosensitive drum 4 is charged by the charger 9, and is exposed to light from the LED array 7, and accordingly, the charge remains only on areas of the periphery surface of the photosensitive drum 4 which have not been exposed to the light. Accordingly, the toner 14 on the outer peripheral surface of the developing roller 13 is attracted to the other areas of the peripheral surface of the developing roller 13 which have exposed to the light so as to effect the developing. Then, the toner 14 sticking to the photosensitive drum 4 is transferred onto a sheet 2 passing between the photosensitive drum 4 and the image transfer roller 5, and further, heat and pressure are applied to the sheet 2 by the fixing roller 15 and the pressing roller 16 so that the toner 14 transferred onto the sheet 2 is melted and fixed.

Further, in the above-mentioned process, although substantially all of the toner 14 on the photosensitive drum 4 is transferred onto the sheet 2, a bit of the toner 14 inevitably remains on the photo-sensitive drum 4. This remaining toner 14 is scraped off by a cleaner 18 which always makes contact with the peripheral surface of the photosensitive drum 4. Accordingly, as already mentioned in the above-mentioned related art, should the feed speed of the printing part A be increased, the rotational speed of the photosensitive drum 4 should be also increased so as to cause the cleaner 18 to wear the photosensitive drum 4. Thus, the feed speed of the printing part A, that is, the rotational speed of the photosensitive drum 4 or the fixing roller 15 has to be set at a relatively low speed.

Although explanation has been made of the preferred embodiment of the present invention in which the printing part A uses the LED array 7, a laser printer, an ink jet or a bubble jet printer can be used, instead thereof. In this printing part A, as shown in FIG. 1, the toner storage 10 is arranged nearer to the front surface 1a of the housing 1 than the photosensitive drum 4, a space t is defined in front of the toner storage 10, and a door member 19 for partitioning between the toner storage 10 and the space t is provided so as to be openable and closable (the door at the open position is shown by the solid line, and at closed position shown by the chain line). It is noted that the lower end part of the door member 19 is pivotally attached to the housing 1 through the intermediary of a shaft 19a. The toner storage 10 is accessed with the highest frequency among other components in the printing part A, due to, for example, consumption of the toner 14. However, with the above-mentioned arrangement, the user can easily access the toner storage for maintenance through the front surface 1a of the housing 1 after the door member 19 is opened.

Meanwhile, the reading part B is composed of a light source 20 such as a fluorescent lamp, a first reading sensor 21 such as a CCD, a lens barrel 22 incorporating lenses, a first white balance plate 23 positioned in the vicinity of a first reading position S1 at which the document 3 is read. Accordingly, light emitted from the light source 20 is projected onto the first white balance plate 23 or the front surface 3a of the document 3 at the first reading position (refer to FIG. 3), and is then led through the lens barrel 22 after its optical path is deflected by reflectors 24, 25, 26 as shown by the chain line. Thus, the light is finally focused for image-forming onto the first reading sensor 21. Accordingly, data on the front surface 3a of the document 3 has been read.

In the image reading and printing apparatus in this embodiment, not only the front surface 3a but also the rear surface 3b (refer to FIG. 3) of the document 3 can be read simultaneously. That is, a second sensor 27 such as a contact type sensor is arranged so as to be adapted to aim at the rear surface 3b of the document, being composed of an LED array 27a as a light source and a sensor body 27b. A second white balance plate 28 is arranged in the vicinity of a second reading position S2 for the second reading sensor 27. Accordingly, with the provision of the second reading sensor 27, during one time feed of the document 3, both front and rear surfaces 3a, 3b of the document 3 are read. Further, the first and second reading positions S1, S2 are shifted from each other in the direction in which the document 3 is fed, and accordingly, white balance plates 23, 28 can be arranged facing the first and second reading sensors 21, 27, respectively. Thus, suitable white balance can be obtained for both front and rear surfaces of the document at actual reading positions (first and second reading positions S1, S2).

Naturally, it is possible to read only one of both surfaces of the document, that is, only the front surface 3a. Further, since only about one-to-fifty of the optical path length of the first reading sensor 21 (CCD) is sufficient for the second reading sensor 27 (contact type sensor), this embodiment is arranged such that the second reading sensor 27 which is compact is located on the side of a conveying path for the document, remote from the first reading sensor 21, while the first reading sensor 21 is located in a relative large space inside of the conveying path for the document 3, and accordingly, both surfaces of the document 3 can be simultaneously read even within a relatively narrow space. Further, the CCD sensor which can perform a process higher than that preformed by the contact type sensor, is used for the front surface of the document which is read with a high frequency in general, and the contact type sensor is used for the rear surface of the document which is read with a low frequency, thereby making it possible to aim at miniaturizing the image reading and printing apparatus while the high speed reading is held.

Next, explanation will be made of sheet and document conveying paths. In general, each of the document and sheet conveying paths are formed in a C-like shape, and the document conveying path is laid inside of the sheet conveying path which is laid on the outside. That is, the sheet 2 is inserted at the lower part of the front face 1a of the housing 1 and is fed through the sheet conveying path so that the sheet 2 is subjected to the printing process, and is then discharged from the upper part of the front face 1a of the housing 1. Further, the document is inserted at the front face of the housing 1 above a part where the sheet is fed, for reading an image thereon, and is fed through the document conveying path which does not cross the sheet conveying path, before it is discharged from the front face of the housing below the part where the sheet is discharged.

Referring to FIG. 1, there are shown the document feed part 30, the sheet feed part 31, the document discharge part 32 and the sheet discharge part 33. A sheet discharge tray 34 is removably attached to the document discharge part 32, and is adapted to receive thereon the document 3 which has passed through the image reading part B, and further, the sheet 2 which has passed through the printing part A is discharged onto the sheet discharge tray 34 from the sheet discharge part 33, being completely inverted so that the printed surface faces up, as indicated by the arrow N3.

Further, the document 3 is led through the document conveying path by way of guides 35, 36, guides 37, 38 and guides 39, 40, between their opposing surfaces. A document feed roller 41, a document separating roller 42, a retard roller 43 and feed rollers 44 to 47 located along the document feed path are rotated in the directions indicated by the arrows so as to convey the document 3. Further, driven rollers 48, 51 are caused to contact the peripheries of the feed rollers 44 to 47, respectively.

Meanwhile, the sheet 2 is led through the sheet conveying path by way of a guide 52, guides 38, 40 and a door member 52 (pivotally attached by a shaft 54), and a guide 69 and a door member 60 (pivotally attached by a shaft 61), between their opposing surfaces. Feed rollers 62 to 64 located along the sheet conveying path are rotated in the directions indicated by the arrows so as to convey the sheet 2. Further, driven rollers 65 to 67 are caused to contact the feed rollers 62 to 64, respectively.

Incidentally, except for the white balance plate 23 and the second reading sensor 27, the above-mentioned reading part B is stored in a unit box 90 while the document feed roller 41, the document separating roller 42 and the driven roller 48 are journalled to the unit box 90. Further, an arm 91 integrally incorporated with the unit box 90 is pivotally attached to the housing 1 by means of a shaft 92 so that it can be swung around the shaft 92 as indicated by the arrow N4 together with the unit box 90, from a position indicated by the solid line to a position (in the above-mentioned space t) indicated by the chain line in FIG. 1. That is, the image reading part B is pivotally attached to the housing 1 so as to open and close the document conveying path. The document 3 may be one of any of various kinds such as those other than regular-shaped sheets and those having different paper qualities. Accordingly, the document 2 is likely to cause trouble such as paper jamming. However, the above-mentioned arrangement facilitates the maintenance for taking out a jamming sheet 2 and so forth after opening the document conveying path.

Figure 2:
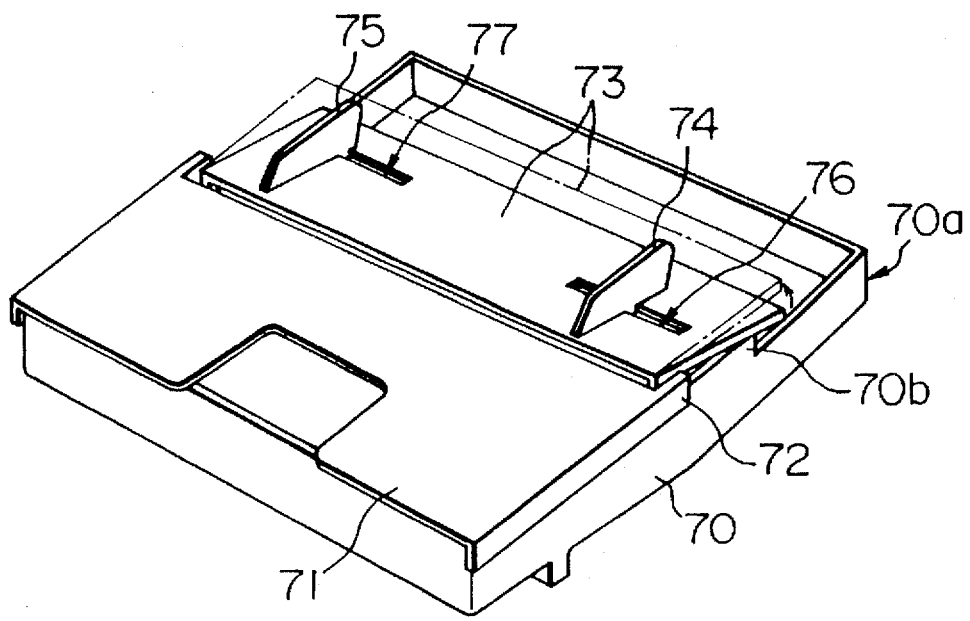
FIG. 2 is a perspective view illustrating a sheet feed cassette relating to the embodiment of the present invention shown in FIG. 1.
Figure 3:
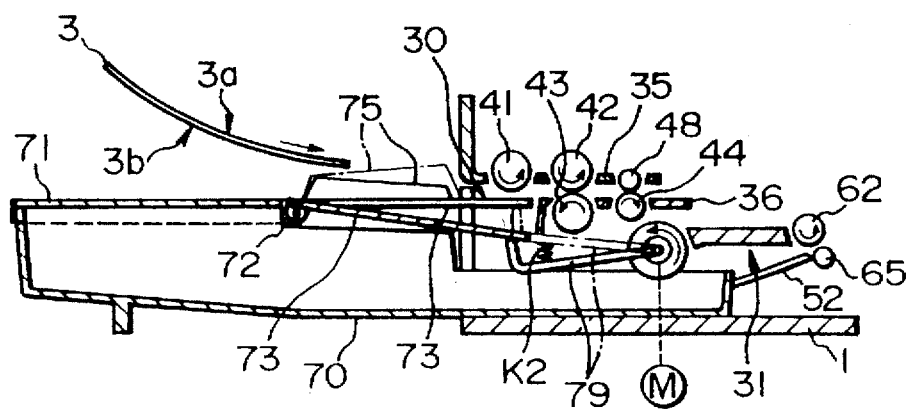
FIG. 3 is an enlarged sectional view illustrating a document supply part and a sheet supply part relating to the embodiment of the present invention.
Figure 4:
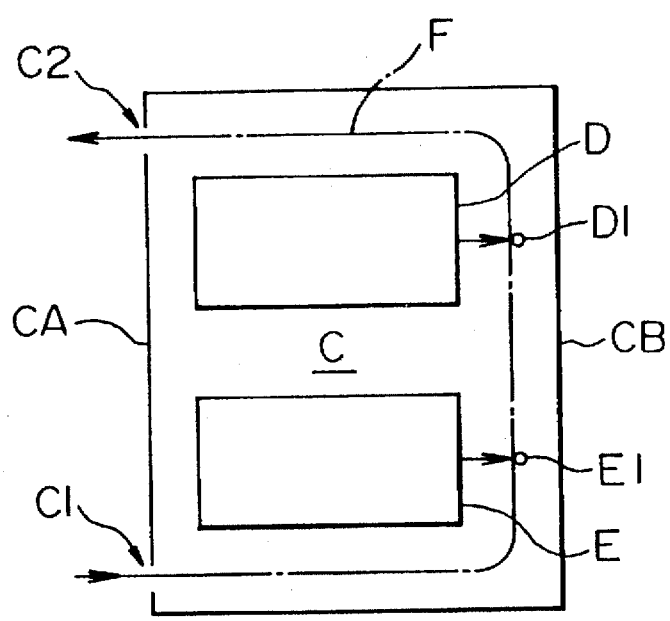
FIG. 4 is a longitudinally sectional view illustrating a conventional image reading and printing apparatus.

Next, explanation will be made of a sheet feed cassette with reference to FIGS. 2 to 3. Referring to FIG. 2, the sheet feed cassette comprises a cassette body 70, a cover 71 removable set on the cassette body 70, a document guide plate 73 pivotally attached to the cover 71 by means of a locking shaft 72, intermediary of the cassette body 70, guide plates 74, 75 slidably fitted in respective slots 76, 77 widthwise formed in the document guide plate 73, for widthwise guiding the document 3. Referring to FIG. 1, when the sheet feed cassette is loaded to the housing 1, the front end edge 70a of the cassette body 70 abuts against the guide 52 so as to position the sheet feed cassette. In FIG. 1, there are shown a feed roller 72 for the sheet 2, a bottom plate 70c urged upward by a spring K1, for putting the sheet 2 into press-contact with the sheet feed roller 78, a pivotable swing arm 79 having its proximal end part which is journalled, coaxial with the sheet feed roller 72 but rotatable being independent from the sheet feed roller 72, and its distal end part which is bent upward in an L-like shape so as to abut against the lower surface of the document guide plate 73, a motor 80 as a swinging means for turning the swing arm 79, and a spring K2 for urging the swing arm 79 upward.

During operation other than reading of the document 3, the swing arm 79 is turned down by the motor 80, overcoming the force of the spring K2, and the document guide plate 73 is also turned down so that its lower surface makes contact with a side part 70b of the cassette body 70. During reading of the document 3, when the action upon the swing arm 79 by the motor 80 is at first released, the swing arm 79 is turned up to an upper position indicated by the chain line, by means of the spring K2 so that the document guide plate 73 is pushed up by the swing arm 79, and accordingly, the document 3 set thereon is made into press contact with the document feed roller 41. It is noted that a cam mechanism may be used as a means for turning down the swing arm 79. Further, the document 3 is fed into the document conveying path by means of the document feed roller 41.

As mentioned above, with the arrangement in this embodiment in which the sheet conveying path for printing, and the document conveying path for image-reading are provided, independent from each other, the printing part is prevented from being excessively damaged due to abrasion or the like even though the document feed speed is set to be high. Further, since the document conveying path is laid inside of the sheet conveying path, the document conveying path can have a short length, the intervals of documents which are successively conveyed during feed of these documents are prevented from increasing, thereby making it possible to perform high speed reading.

Further, according to the present invention, since the document feed part 30 is arranged above the sheet feed part 31, the sheet feed part 30 does not hinder the document 3 from being set into the document feed part 30. Further, since the document 3 has not in general a regular form, it is usually inserted manually. On the contrary, since the sheet 3 has in general a regular form, the frequency of replacement of sheets is low. Accordingly, with the provision of the above-mentioned arrangement in which the document feed part 30 is located above the sheet feed part 31, it is possible to enhance the manipulatability during supply of the document 3.

Further, in the present embodiment in which the vertically swingable document guide plate is provided on the cover of the sheet feed cassette, it is possible to miniaturize the document and the sheet feed parts.

According to the present invention, each of the sheet conveying path for the printing part, and the document conveying path for the reading part is formed in a C-like shape, and the document conveying path is laid inside of the sheet conveying path so that it is shorter than the sheet conveying path. As a result, it is possible to carry out the reading of the document at a high speed in a short time while abrasion of the printing part can be prevented.

What is claimed is:

1. An image reading and printing apparatus comprising:
a housing having front and rear faces, opposite side faces, and top and bottom faces, said front and rear faces being positioned between said top and bottom faces and between said opposite side faces,
a printing part for performing printing on a sheet such as an ordinary sheet, and
a reading part for reading data from a document, said printing part and said reading part being vertically and integrally incorporated with each other within said housing, means provided at said front face of said housing, for supplying and discharging the document at said front face of said housing and means provided at said front face of said housing, for supplying and discharging the sheet at said front face of said housing; said printing part including a sheet conveying path formed in a C-like shape; said reading part including a document conveying path formed in a C-like shape which is laid inside of said sheet conveying path and which is shorter than the same.

2. An image reading apparatus as set forth in claim 1, wherein said reading part is pivotally attached to said housing so as to open and close said document conveying path.

3. An image reading and printing apparatus comprising:
a housing having front and rear faces, opposite side faces, and top and bottom faces, said front and rear faces being positioned between said top and bottom faces and between said opposite side faces, a printing part for performing printing on a sheet such as an ordinary sheet, and a reading part for reading data from a document, which are vertically and integrally incorporated with each other within said housing, the document and the sheet being fed and discharged at said front face of said housing; a sheet conveying path provided in said printing part and formed in a C-like shape; a document conveying path provided in said reading part and formed in a C-like shape which is laid inside of said sheet conveying path and which is shorter than the same, wherein said document conveying path has a document supply part, and said sheet conveying path has a sheet supply part which is laid lower than said document supply part.

4. An image reading and printing apparatus as set forth in claim 3, wherein said sheet supply part is loaded therein with a sheet supply cassette in which sheets are stored, to which a document guide plate carrying thereon the document, is pivotally attached, and on which swing means for swinging said document guide plate so as to lead the document to said document conveying path is provided.

5. An image reading and printing apparatus comprising:

a housing having a front face, a printing part for performing printing on a sheet such as an ordinary sheet, and a reading part for reading data from a document, which are vertically and integrally incorporated with each other within said housing, the document and the sheet being fed and discharged at said front face of said housing; a sheet conveying path provided in said printing part and formed in a C-like shape; a document conveying path provided in said reading part and formed in a C-like shape which is laid inside of said sheet conveying path and which is shorter than the same, wherein said reading part incorporates a second reading sensor arranged outside of said document conveying path, for reading data on a rear surface of the document, and a first reading sensor arranged inside of said document conveying path and having an optical path longer than that of said second reading sensor, for reading data on a front surface of the document.

6. An image reading and printing apparatus comprising:

a housing having front and rear faces, opposite side faces, and top and bottom faces, said front and rear faces being positioned between said top and bottom faces and between said opposite side faces;

means located in said housing, for reading an image;

printing means located in said housing;

a sheet feed part laid on one of said side faces of said housing, for feeding a printing sheet to said printing means; and a document feed part laid on said one of said side faces of said housing above said sheet feed part, for receiving therein a document which bears thereon an image to be read by said reading means.

7. An image reading apparatus as set forth in claim 6, wherein a sheet discharge part for receiving the sheet which is fed from said sheet feed part and printed by said printing means is laid on said one of said side faces of said housing.

8. An image reading apparatus as set forth in claim 7, wherein a document discharge part for receiving the document which is fed from said document feed part and read by said image reading means is laid on said one of said side faces of said housing.

9. An image reading apparatus as set forth in claim 8, wherein said sheet discharge part is located above said document discharge part.

10. An image reading and printing apparatus comprising:

a housing having front and rear faces, opposite side faces, and top and bottom faces, said front and rear faces being positioned between said top and bottom faces and between said opposite side faces;

means located in said housing, for reading an image;

printing means located in said housing below said image reading means;

a sheet feed part laid on one of said side faces of said housing, for feeding a printing sheet to said printing means; and a document feed part laid on said one of said side faces of said housing above said sheet feed part, in which a document bearing thereon an image to be read by said image reading means is inserted.

11. An image reading apparatus as set forth in claim 10, wherein a sheet discharge part for receiving the sheet which is fed from said sheet feed part and printed by said printing means is laid on said one of said side faces of said housing, and a document discharge part for receiving the document which is fed from said document feed part and read by said image reading means is laid on said one of said side faces of said housing, said sheet discharge part being located above said document discharge part.

12. An image reading and printing apparatus comprising:

a housing having front and rear faces, opposite side faces, and top and bottom faces, said front and rear faces being positioned between said top and bottom faces and between said opposite side faces;

means located in said housing, for reading an image;

printing means located in said housing; a sheet feed part laid on one of said side faces of said housing, for feeding a printing sheet to said printing means;

a document feed part laid on said one of said side faces of said housing above said sheet feed part, in which a document bearing thereon an image to be read by said image reading means is inserted;

a document discharge part for discharging the document which is fed from said document feed part and read by said image reading means;

a discharged sheet tray for receiving the document discharged by said document discharge part; and a sheet discharge part for discharging the sheet which is printing by said printing means, so as to set said sheet on said dischaged sheet tray.

13. An image reading apparatus as set forth in claim 12, wherein said sheet feed part is loaded thereon with a sheet cassette for storing therein a plurality of sheets, and has an upper surface on which a plurality of documents are set.

14. An image reading and printing apparatus comprising:

a housing having front and rear faces, opposite side faces, and top and bottom faces, said front and rear faces being positioned between said top and bottom faces and between said opposite faces;

means located in said housing, for reading an image;

printing means located in said housing;

a sheet feed part laid on one of said side faces of said housing, for feeding a printing sheet to said printing means;

a document feed part laid on said one of side faces of said housing above said sheet feed part, in which a document bearing thereon an image to be read by said image reading means is inserted;

a sheet conveying path for leading a sheet fed from said sheet feed means to said printing means, and leading the sheet after printing so as to discharge the sheet outside of said housing; and a document conveying path for leading a document from said document feed part to said image reading means, and leading the document after reading of an image thereon, so as to discharge the document outside of said housing, said document conveying path being laid so as to avoid crossing said sheet conveying path.

15. An image reading apparatus as set forth in claim 14, wherein said sheet conveying path and said document conveying path discharge the sheet and the document, respectively, from said one of said side faces of said housing.

16. An image reading and printing apparatus comprising:

a housing having a front face, a printing part for performing printing on a sheet such as an ordinary sheet, and a reading part for reading data from a document, said printing part and said reading part being vertically and integrally incorporated with each other within said housing, means provided at said front face of said housing, for supplying and discharging the document at said front face of said housing and means provided at said front face of said housing, for supplying and discharging the sheet at said front face of said housing: said printing part including a sheet conveying path formed in a C-like shape; said reading part including a document conveying path formed in a C-lie shape which is laid inside of said sheet conveying path and which is shorter than the same, wherein said reading part has reading sensors provided outside and inside of said document conveying path.

* * * * *